United States Patent
Wu

(10) Patent No.: US 11,587,201 B2
(45) Date of Patent: Feb. 21, 2023

(54) IMAGE PROCESSING DEVICE AND IMAGE PROCESSING METHOD

(71) Applicant: Coretronic Corporation, Hsin-Chu (TW)

(72) Inventor: Jian-Jiun Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/679,129

(22) Filed: Feb. 24, 2022

(65) Prior Publication Data

US 2022/0180471 A1 Jun. 9, 2022

Related U.S. Application Data

(62) Division of application No. 16/427,301, filed on May 30, 2019, now abandoned.

(51) Int. Cl.
*G06T 3/40* (2006.01)
*H04N 5/232* (2006.01)

(52) U.S. Cl.
CPC ........... *G06T 3/40* (2013.01); *H04N 5/23229* (2013.01)

(58) Field of Classification Search
CPC .... G06T 3/40; H04N 5/23229; H04N 9/3179; H04N 9/3147
See application file for complete search history.

(56) References Cited

U.S. PATENT DOCUMENTS

| | | | | |
|---|---|---|---|---|
| 2008/0101696 A1* | 5/2008 | Noh | .................... | H04N 5/2351 382/168 |
| 2010/0118160 A1* | 5/2010 | Tsurumi | ................ | G06T 3/0087 348/231.2 |
| 2010/0271498 A1* | 10/2010 | Hwang | ................ | H04N 5/2355 348/222.1 |
| 2015/0098499 A1* | 4/2015 | Tominaga | ............ | H04N 19/463 375/240.02 |
| 2017/0024178 A1* | 1/2017 | Jeong | ...................... | G06F 16/50 |
| 2017/0180618 A1* | 6/2017 | Georgiev | ........... | H04N 5/23229 |

* cited by examiner

*Primary Examiner* — Qun Shen
(74) *Attorney, Agent, or Firm* — JCIPRNET

(57) ABSTRACT

An image processing device and an image processing method are provided. The image processing device comprises a receiving module, a interface conversion module, a selecting module, and a controller. The receiving module is configured to receive image signals. The interface conversion module is configured to convert the image signals into converted image signals with a target image interface. The selecting module is configured to generate at least two selected image signals from the converted image signals according to the first selecting signal. The controller is configured to provide the first selecting signal to selecting module. The image processing device generates the composite image by overlaying the at least two selected image signals.

20 Claims, 3 Drawing Sheets

IMAGE PROCESSING DEVICE AND IMAGE PROCESSING METHOD

CROSS-REFERENCE TO RELATED APPLICATION

This application is a divisional application of and claims the priority benefit of U.S. patent application Ser. No. 16/427,301, filed on May 30, 2019, the disclosure of which is incorporated by reference herein in its entirety.

BACKGROUND

Technical Field

The invention relates to an image processing device and an image processing method, especially relates to an image processing device for generating a composite image and a method thereof.

Description of Related Art

In general, the image compositing technology of projectors mostly has the function of combining image signals into a composite image. The projectors may divide image signals into two signal groups when receiving image signals. In each of the projectors, the signal groups may determine the selected image signals by at least one switch. Next, the projectors may perform image operation on the selected image signals, such as picture-in-picture (PiP) operation, picture-by-picture operation (PbP) and picture-on-picture (PoP) operation, to generate the composite image.

However, Due to the current hardware design of the image processing device, the combination of two the image signals for the composite image by PIP operation, PbP operation and PoP operation must be limitedly selected. That is, the current image processing device has no capability to generating a composite image by arbitrary combination of two received image signals. In addition, the configuration of the switches generates a "T" or a "Y" branch topology for the signal transmission path. As a result, the high frequency signal will not be matched due to the layout of the transmission path, and a risk of signal bouncing of the image signals with high frequency will occur.

The information disclosed in this "BACKGROUND" section is only for enhancement of understanding of the background of the described technology and therefore it may contain information that does not form the prior art that is already known to a person of ordinary skill in the art. Further, the information disclosed in the "BACKGROUND" section does not mean that one or more problems to be resolved by one or more embodiments of the invention were acknowledged by a person of ordinary skill in the art.

SUMMARY

The invention provides an image processing device having a receiving module and a selected module, so as to perform composite image operations on arbitrary combination of two received image signals and prevent a risk of signal bounce of the image signals.

Furthermore, the image processing device selectively outputs a loop-out selected image signal to other projectors, so as to achieve image signals stitching for multiple projectors.

Other objectives and advantages of the invention can be further understood from the technical features disclosed in the invention.

In order to achieve one or a portion of or all of the objectives or other objectives, an embodiment of the invention provides an image processing device configured to generate a composite image. The image processing device includes a receiving module, a interface conversion module, a selecting module, and a controller. The receiving module is configured to receive image signals. The interface conversion module is coupled to the receiving module. The interface conversion module is configured to convert the image signals into converted image signals with a target image interface. The selecting module is coupled to the interface conversion module. The selecting module is configured to generate at least two selected image signals from the converted image signals according to a first selecting signal. The controller is coupled to the receiving module and the selection module. The controller is configured to provide the first selecting signal to selecting module. The image processing device generates the composite image by overlaying the at least two selected image signals.

In order to achieve one or a portion of or all of the objectives or other objectives, an embodiment of the invention provides an image processing method for generating a composite image is adapted to an image processing device. The image processing device includes a receiving module, a interface conversion module, a controller and a selecting module. The image processing method includes: receiving image signals by the image processing device; providing a first selecting signal to the selecting module by the controller; converting the image signals into converted image signals with a target image interface by the interface conversion module; generating at least two selected image signals from the converted image signals according to the first selecting signal by the selecting module; and generating the composite image by overlaying the at least two selected image signals.

Based on the above, the invention provides a image processing device and a method thereof to receiving a plurality of image signals, converting the image signals into converted image signals with a target image interface and generating at least two selected image signals from the converted image signals according to a first selecting signal, so as the image processing device and the method thereof can perform image operations on arbitrary combination of two received image signals and prevents a risk of signal bounce of the image signals.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
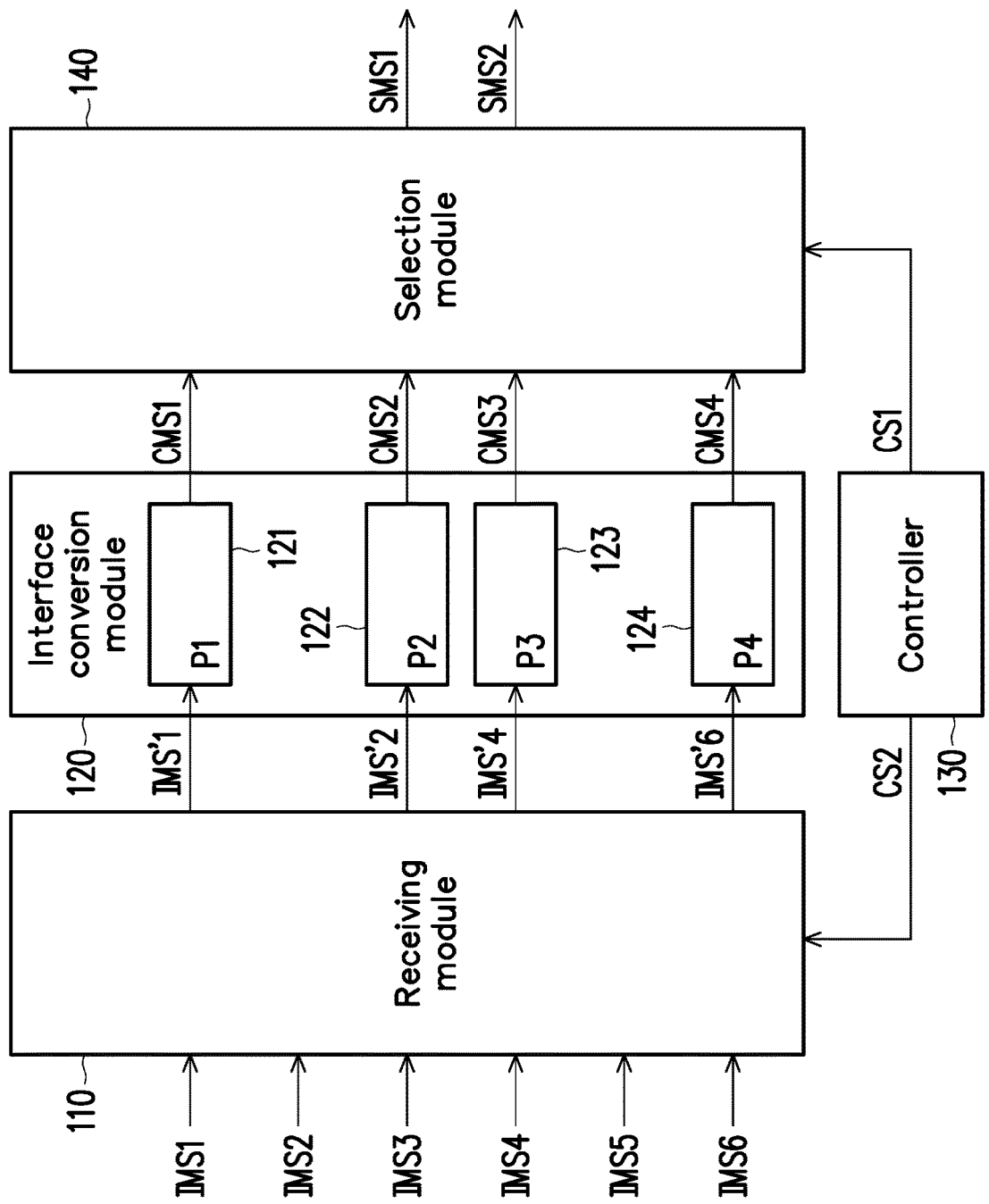
FIG. 1 is a schematic view illustrating an image processing device according to an embodiment of the invention.

Referring to FIG. 1, FIG. 1 is a schematic view illustrating an image processing device according to an embodiment of the invention. In the embodiment, the image processing device 100 the image processing device generates a composite image by overlaying at least two selected image signals, wherein the image processing device 100 includes a receiving module 110, an interface conversion module 120, a controller 130 and a selecting module 140. The receiving module 110 is configured to receive image signals IMS1 to IMS6. In the embodiment, the receiving module 110 may be implemented by multiple interface port to support and then the image signals IMS1 to IMS6 with different image interfaces. For example, an image interface of image signal IMS1 is VGA interface, an image interface of image signals IMS2 is RJ-45 interface, an image interface of image signals IMS3 to IMS5 is HDMI interface, an image interface of image signals IMS5 is DVI interface, and an image interface image signal IMS6 is 3G SDI interface. Therefore, the receiving module 110 is an interface adapted to receiving image signals with HDMI, DVI, RJ-45 VGA or 3G SDI interface. For example, the receiving module 110 comprises an IT 6634 chip or an integrated circuit. The invention is not limited to the embodiment. In other embodiment, the receiving module 110 may comprise some chips or circuits, for example two IT 6634 chips, to at least receive more image signals with HDMI and DVI interface. In other embodiment, the receiving module 110 may further comprise some chips or circuits, for example physical switches, one VS100 and IT 6634 chips, to at least receive more image signals with RJ-45 and 3G SDI interface.

In some embodiment, the receiving module 110 further converts the image interface of the image signals. For example, the receiving module 110 may convert the image signal with RJ-45 interface into the image signals with HDMI interface.

In this embodiment, the receiving module 110 further includes switches or matrixes, so as to reduce complexity and cost of the circuit board. For example, one of the image signals IMS2 to IMS4 can be selected as the image signal IMS'2 and transmitted to the interface conversion module 120.

In the embodiment, the interface conversion module 120 is coupled to the receiving module 110. The interface conversion module 120 is configured to receive the image signals IMS'1, IMS'2, IMS'4, IMS'5 from the receiving module 110 and convert the image signals IMS'1, IMS'2, IMS'4, IMS'5 into converted image signals CMS1 to CMS4 with a target image interface. The target image interface is a digital interface. For example, the digital interface is digital RGB interface or digital YCbCr interface. In addition, the interface conversion module 120 is configured to transmit the converted image signals CMS1 to CMS4 to the selecting module 140 respectively via a plurality of individual transmission paths. For example, the interface conversion module 120 may be a chip or integrated circuit. The interface conversion module 120 includes interface converters 121 to 124. For example, the interface converters 121 to 124 may be ADI 7604, ITE68051, GS2961, etc. The interface converters 121 receives the image signal IMS'1, converts the image signal IMS'1 into converted image signal CMS1 in the transmission path P1, and transmits the converted image signal CMS1 in the transmission path P1. The interface converters 122 receives the image signal IMS'2, converts the image signal IMS'2 into converted image signal CMS2 in the transmission path P2, and transmits the converted image signal CMS2 in the transmission path P2. The interface converters 123 receives the image signal IMS'4, converts the image signal IMS'4 into converted image signal CMS3 in the transmission path P3, and transmits the converted image signal CMS3 in the transmission path P3. The interface converters 124 receives the image signal IMS'6, converts the image signal IMS'6 into converted image signal CMS4 in the transmission path P4, and transmits the converted image signal CMS4 in the transmission path P4.

All of transmission paths P1 to P4 are independent path and not connected to each other, and thus the configuration of interface conversion module 120 cannot generate a "T" or a "Y" branch topology for the signal transmission path. Therefore, a risk of signal bounce of the image signals IMS1 to IMS6 and converted image signals CMS1 to CMS4 with high frequency will not occur.

In the embodiment, the selecting module 140 is coupled to the interface conversion module 120. The selecting module 140 is configured to generate selected image signals SMS1 and SMS2 from the converted image signals CMS1 to CMS4 according to the first selecting signal CS1. In the embodiment, the selection module 140 may be implemented by a FPGA. In some embodiment, the selecting module 140 is for example programmable general-purpose or specific-purpose Microprocessor, Digital Signal Processor (DSP), Application Specific Integrated Circuit (ASIC), Programmable Logic Device (PLD), any other similar device or any device controlled based on software or firmware executing the corresponding function, but the disclosure is not limited thereto. In addition, the number of selected image signals of the embodiment is two. Depending on the requirement of the composite image, the number of selected image signals of the invention may be positive integers greater than or equal to two. The invention is not limited to the embodiment.

In the embodiment, the controller 130 is coupled to the receiving module 110 and the selection module 140. The controller 130 is configured to provide the first selecting signal CS1 to the selecting module 140. About the selecting signal CS1, the controller 130 may provide the selecting signal CS1 according to two or more of the image signals IMS1 to IMS6 selected in the combination of the composite image. The combination may be preset or determined based on usage requirements. In the embodiment, the controller 130 may be a Central Processing Unit (CPU) Or Other Programmable General-Purpose or Specific-Purpose Microprocessor, Digital Signal Processor (DSP), Programmable Controller, Application Specific Integrated Circuit (ASIC), Programmable Logic Device (PLD), other similar devices, or a combination thereof. The computing device 120 is capable of loading and executing a computer program to complete a corresponding operational function. In the embodiment, the image processing device 100 may generate a composite image by overlaying selected image signals SMS1 and SMS2. For example, the image processing device 100 may perform picture-in-picture (PiP) operation, picture-by-picture operation (PbP) and picture-on-picture (PoP) operation on the selected image signals SMS1 and SMS2 to generate the composite image.

In addition, the controller 130 further provides a second selecting signal CS2 to the receiving module 110. About the second selecting signal CS2, the controller 130 may provide the second selecting signal CS2 according to whether any the image signals IMS2 to IMS5 settled as the selected image signals SMS1 and SMS2. The combination of two selected image signals SMS1 and SMS2 may be preset or determined based on usage requirements. For example, the receiving module 110 may select the image signals IMS2, IMS4 from the image signals IMS2 to IMS5 according to the second selecting signal CS2, and provide the image signals IMS2, IMS4 to the interface conversion module 120. In other words, the second selecting signal CS2 indicates that at least one of the image signals IMS2 to IMS5 with a first image interface is converted into the converted image signals with the target image interface.

It should be noted that, the receiving module 110 receives the image signals IMS1 to IMS6. The interface conversion module 120 converts the image signals (for example, the image signals IMS1, IMS2, IMS4, IMS5) into converted image signals CMS1 to CMS4, and individual transmission paths P1 to P4. The selection module 140 generates selected image signals SMS1 and SMS2 from the converted image signals CMS1 to CMS4 according to the first selecting signal CS1. Therefore, the image processing device 100 can perform image operations on arbitrary combination of all received image signals IMS1 to IMS6 and prevents a risk of signal bounce of the image signals IMS1 to IMS6 and converted image signals CMS1 to CMS4 with high frequency will not occur.

Figure 2:
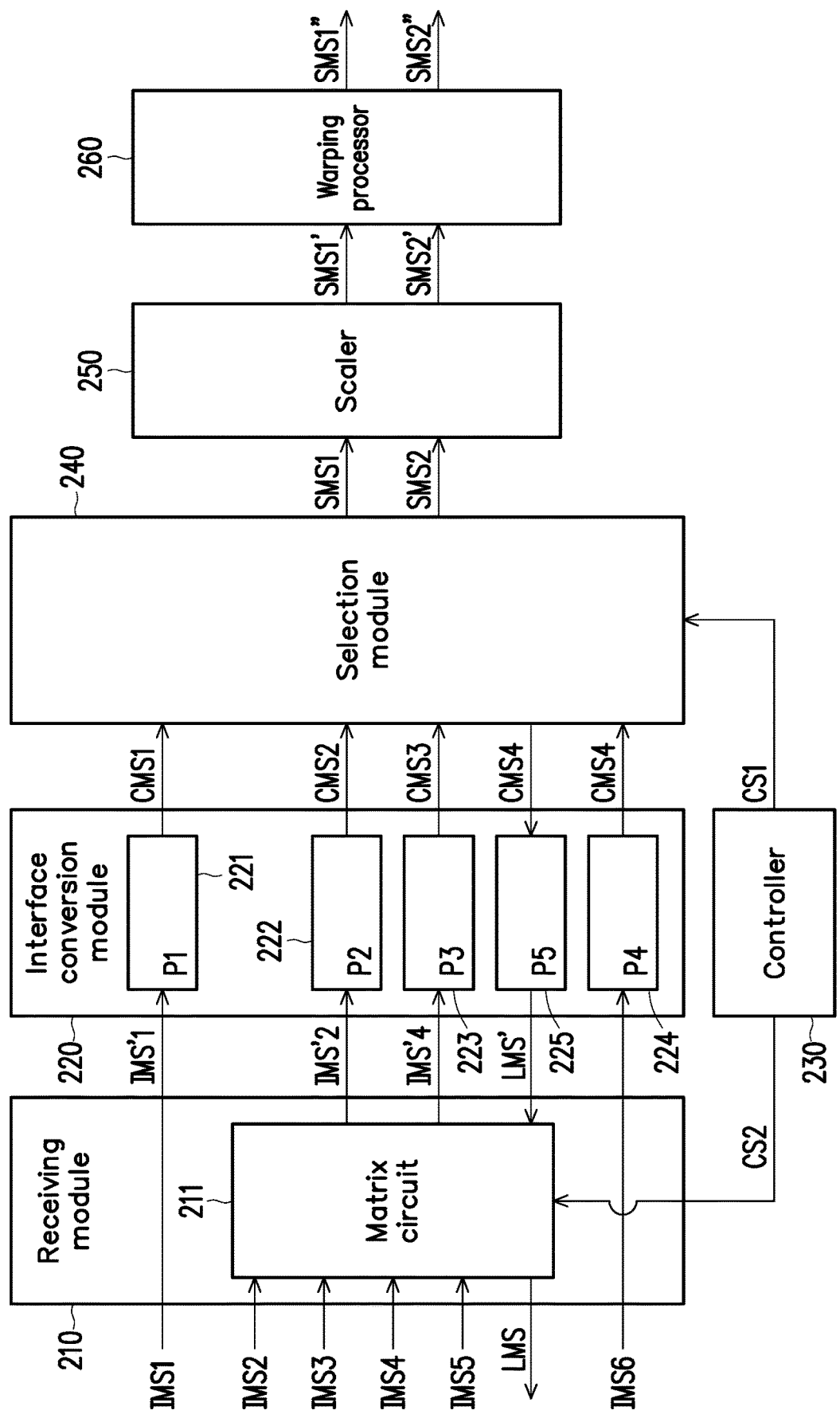
FIG. 2 is a schematic view illustrating an image processing device according to another embodiment of the invention.

Referring to FIG. 2, FIG. 2 is a schematic view illustrating an image processing device according to another embodiment of the invention. In the embodiment, the image processing device 200 includes a receiving module 210, an interface conversion module 220, a controller 230 and a selecting module 240. The configuration between the receiving module 210, the interface conversion module 220, the controller 230 and the selecting module 240 is already described in detail in the configuration between the receiving module 110, the interface conversion module 120, the controller 130 and the selecting module 140 in the embodiment of FIG. 1. Thus, configuration details in this regard will not be repeated in the following.

In the embodiment, the receiving module 210 includes a matrix circuit 211. The matrix circuit 211 is coupled to the interface conversion module 220 and the controller 230. The matrix circuit 211 receives the second selecting signal CS2 from the controller 230. The matrix circuit 211 may receive the image signals IMS2 to IMS5 with the first image interface (for example, HDMI interface) and may transmit the image signals IMS'2, IMS'4 (the two of the image signals IMS2 to IMS5) with the first image interface to the interface conversion module 220 according to the second selecting signal CS2. In one embodiment, the matrix circuit 211 may receive more than one kind of digital interface, wherein the digital interface may include HDMI interface, DVI interface or other digital interface. In other embodiment, the receiving module 210 may further include an analog switch coupled to the interface conversion 220 and controller 230. The analog switch may receive the third selecting signal (not show) provided by the controller 230, any transmit two of received image signal with analog interface to the interface conversion 220. This is, the matrix circuit 211 may be any kind device having the matrix architecture to receive input signals and transmit at least one of the input signals, or any kind of the device achieving a similar function thereof.

The interface conversion module 220 includes interface converters 121 to 124. The interface converter 221 converts one of the image signals in analog image interface carrying analog signal into the converted image signal in the digital image interface carrying digital signal. For example, the interface converter 221 may receive the image signal IMS1 with VGA interface, convert the image signal IMS1 into the converted image signal CMS1 with target image interface (for example, RGB interface), and transmit the converted image signal CMS1 to the selecting module 240.

In the embodiment, the interface converters 222, 223 convert the at least one of the image signals with the first image interface into the converted image signals with the target image interface. For example, the interface converter 222 may receive the image signal IMS'2 with HDMI interface from the matrix circuit 211, convert the image signal IMS'2 into the converted image signal CMS2 with target image interface (for example, RGB interface), and provide the converted image signal CMS2 to the selecting module 240. Similarly, the interface converter 223 may receive the image signal IMS'3 with HDMI interface from the matrix circuit 211, convert the image signal IMS'4 into the converted image signal CMS3 with target image interface (for example, RGB interface), and provide the converted image signal CMS3 to the selecting module 240. In some embodiments, the interface converters 222, 223 may be integrated into one interface converter having multiple input ports and multiple output ports.

In some embodiments, the interface converter 222 may scale-down a resolution of the converted image signal CMS2. For example, the interface converter 222 may scale-down a resolution of the converted image signal CMS2 from 4K to 2K. In some embodiments, the interface converter 223 may scale-down the resolution of the converted image signal CMS3.

In the embodiment, the interface converters 224 is coupled between the receiving module 210 and the selecting module 240, may convert the image signal IMS6 with 3G SDI interface into the converted image signal CMS4 with the target image interface (for example, RGB interface). In some embodiment, the interface converters 224 convert the image signal IMS6 with 3G SDI interface into the converted image signal CMS4 with the digital image interface (for example, YCbCr interface). In the embodiment, the image processing device 200 further outputs a loop-out selected image signal LMS to the interface conversion module 220 and the receiving module 210.

In detail, in the embodiment, the controller 230 provides a loop-out selecting signal to the selecting module 240 and the receiving module 210. The loop-out selecting signal indicates one of the image signals IMS1 to IMS6 as the loop-out selected image signal LMS, and then the receiving module 210 according to the loop-out selecting signal outputs one of the image signals IMS1 to IMS6 via the matrix circuit 211 of the receiving module 210 or outputs one of the converted image signals CMS1 and CMS4 via the selecting module 240.

In one condition that the image signals IMS1 to IMS6 as the loop-out selected image signal LMS, the matrix circuit 211 of the receiving module 210 selects one of the image signals IMS1 to IMS6 when the receiving module 210 receives the loop-out selecting signal. For example, the receiving module 210 selects the image signal IMS4 according to the loop-out selecting signal, and outputs the image signal IMS4 as the loop-out selected image signal LMS, wherein the image interface of the image signal IMS4 is HDMI.

In other condition that one of converted image signals CMS1 or CMS4 as the loop-out selected image signal LMS, the selecting module 240 selects one of the converted image signals CMS1 and CMS4 when receiving the loop-out selecting signal. For example, the selecting module 240 selects the converted image signal CMS4 according to the loop-out selecting signal, and provides the converted image signal CMS4 to the interface conversion module 220. The interface conversion module 220 further includes an interface converter 225. The interface converter 225 converts the one of the converted image signals CMS1 and CMS4 with the target image interface into a loop-out selected image signal SMS with the first image interface. For example, the interface converter 225 receives the converted image signal CMS4 with RGB interface from the selecting module 240, converts the converted image signal CMS4 into a loop-out selected image signal LMS' with HDMI interface, and provides the loop-out selected image signal LMS' to the matrix circuit 211. In the embodiment, the matrix circuit 211 receives the loop-out selected image signal LMS' from the interface converter 225, and then outputs the loop-out selected image signal LMS according to the loop-out selecting signal. Therefore, the loop-out selected image signal LMS may be provided to other projectors (or other image processing devices) to achieve a composition of image signals of multiple projectors. For example, the interface converters 225 may be ITE 6613 etc.

Similarly to the interface converter 221 to 224 (or the interface converter 121 to 124 in FIG. 1), the interface converter 225 provides a transmission path P5 for transmitting the converted image signal CMS4. For example, the interface converters 225 provides a transmission path P5 for transmitting the converted image signal CMS4, and converts the image signal CMS4 into converted image signal LMS' in the transmission path P5. In the embodiment, the transmission paths P1 to P5 are not connected to each other, and the transmission paths P1 to P5 are independent of each other. Therefore, a risk of signal bounce of the image signals IMS'1 to IMS'6 and converted image signals CMS1 to CMS4 with high frequency will not occur.

In the embodiment, the selecting module 240 further performs a color space conversion on the interface of the converted image signals CMS1 to CMS4. For example, the target image interface is RGB interface or YCbCr interface. The interface converters 224 may convert the image signal IMS6 with 3G SDI interface into the converted image signal CMS4 with YCbCr interface. The selecting module 240 may perform the color space conversion on the interface of the converted image signal CMS4 with YCbCr interface and converts the converted image signal with YCbCr interface into the selected image signal with RGB interface.

In the embodiment, the image processing device 200 further includes a scaler 250 and a warping processor 260. For example, a scaler 250 comprises an i-Chips 821 chip or an integrated circuit with the same function. A warping processor 260 may comprise i-Chips 789 chip or an integrated circuit with the same function. The scaler 250 is coupled to the selection module 240. The scaler 250 is configured to extend or shorten at least one of the selected image signals SMS1, SMS2. For example, the scaler 250 extends the selected image signals SMS1 to generate a modified image signal SMS1'. For example, the scaler 250 shortens the selected image signals SMS2 to generate a modified image signal SMS2'. The warping processor 260 is coupled to the scaler 250. The warping processor 260 is configured to perform a warping operation to the selected image signals SMS1', SMS2' to generate warped image signals SMS1" and SMS2". The image processing device 200 may generate the composite image (not shown) by overlaying the warped image signals SMS1" and SMS2". It will be appreciated that the image processing device 200 can have at least one of the scaler 250 and the warping processor 260 based on usage requirements. In some embodiment, the scaler 250 and the warping processor 260 are for example programmable general-purpose or specific-purpose Microprocessor, Digital Signal Processor (DSP), Application Specific Integrated Circuit (ASIC), Programmable Logic Device (PLD), any other similar device or any device controlled based on software or firmware executing the corresponding function, but the disclosure is not limited thereto.

Figure 3:
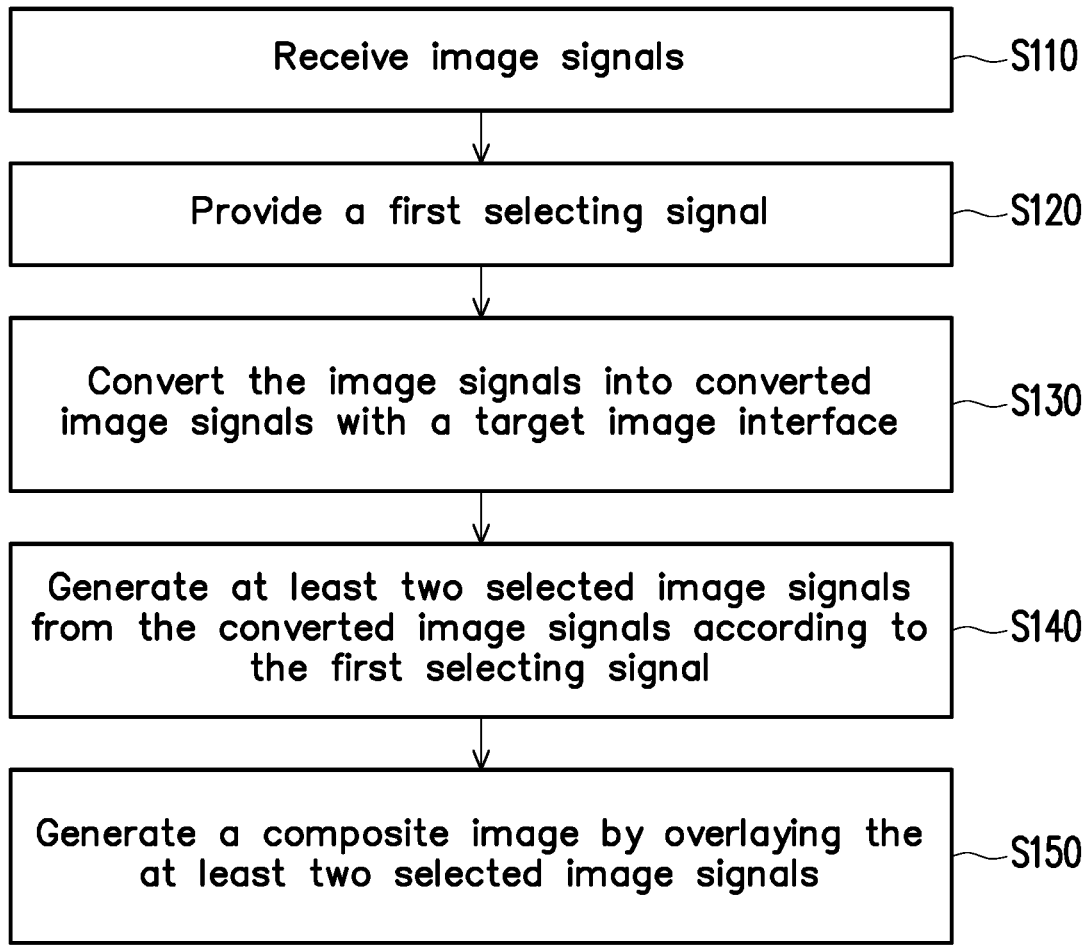
FIG. 3 is a flowchart illustrating an image processing method according to an embodiment of the invention.

FIG. 3 is a flowchart illustrating an image processing method according to an embodiment of the invention. Referring to FIG. 3, the image processing method for generating a composite image is adapted to the image processing device 100. In the embodiment, in a step S110, the receiving module 110 receives image signals IMS1 to IMS6. In a step S120, the controller 130 provides a first selecting signal CS1 to the selecting module. In a step S130, the interface conversion module 120 converts the image signals IMS'1 to IMS'6 into converted image signals CMS1 to CMS4 with a target image interface. In a step S140, the selecting module 140 generating at least two selected image signals (for example, selected image signals SMS1, SMS2) from the converted image signals CMS1 to CMS4 according to the first selecting signal CS1. In a step S150, the image processing device 100 generates the composite image by overlaying the at least two selected image signals SMS1, SMS2. The steps S110 to S150 are already described in detail in the embodiment of FIG. 1. Thus, details in this regard will not be repeated in the following. It will be appreciated that the steps S110 to S150 is also adapted to the image processing device 200 in the embodiment of FIG. 2.

Based on the above, the image processing device and the image processing method of the invention receives a plurality of image signals, converts the image signals into converted image signals with a target image interface and generating at least two selected image signals from the converted image signals according to a first selecting signal, so as the invention can perform composite image operations on arbitrary combination of two received image signals and prevent a risk of signal bounce of the image signals. In addition, the image processing device and the image processing method of the invention may provide a loop-out selected image signal from the receiving module. Therefore, the loop-out selected image signal may be provided to other projectors to achieve image signals stitching for multiple projectors.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. An image processing device, configured to generate a composite image, comprising:
    a receiving module, configured to receive a plurality of image signals;
    an interface conversion module, coupled to the receiving module, and configured to convert the image signals into a plurality of converted image signals with a target image interface;
    a selecting module, coupled to the interface conversion module, configured to generate at least two selected image signals from the converted image signals according to a first selecting signal; and
    a controller, coupled to the receiving module and the selecting module, and configured to provide the first selecting signal to the selecting module,
        wherein the image processing device generates the composite image by overlaying the at least two selected image signals,
        wherein the controller provides a loop-out selecting signal to the selecting module and the receiving module, the receiving module outputs a loop-out selected image signal with a first image interface according to the loop-out selecting signal, wherein the loop-out selecting signal indicates one of the image signals as the loop-out selected image signal.

2. The image processing device as claimed in claim 1, wherein the interface conversion module transmits the converted image signals into the selecting module respectively via a plurality of individual transmission paths.

3. The image processing device as claimed in claim 1, wherein the receiving module comprises a matrix circuit, wherein the matrix circuit is coupled to the interface conversion module and the controller, and the matrix circuit is configured to output the loop-out selected image signal according to the loop-out selecting signal.

4. The image processing device as claimed in claim 1, wherein the interface conversion module comprises a second interface converter, wherein the second interface converter converts the one of the converted image signals with the target image interface into the loop-out selected image signal with the first image interface, and transmits the loop-out selected image signal to the receiving module.

5. The image processing device as claimed in claim 1, wherein the interface conversion module comprises a third interface converter, wherein the third interface converter converts one of the image signals carrying analog signal to the converted image signal carrying digital signal.

6. The image processing device as claimed in claim 5, wherein the one of the image signals is with a VGA interface.

7. The image processing device as claimed in claim 1, wherein the interface conversion module comprises a fourth interface converter, wherein the fourth interface converter is coupled between the receiving module and the selecting module and converts one of the image signals into the converted the image signal with a YCbCr interface.

8. The image processing device as claimed in claim 7, wherein the selecting module converts the converted image signal with a YCbCr interface into the selected image signal with the target image interface.

9. The image processing device as claimed in claim 1, further comprising:
    a scaler, coupled to the selecting module, configured to extend or shorten at least one of the selected image signals.

10. The image processing device as claimed in claim 9, further comprising:
    a warping processor, coupled to the scaler, configured to perform a warping operation to the selected image signals.

11. The image processing device as claimed in claim 1, wherein the selecting module is implemented by a FPGA.

12. An image processing method for generating a composite image, adapted to an image processing device, wherein the image processing device comprises a receiving module, an interface conversion module, a controller and a selecting module, wherein the image processing method comprises:
    receiving a plurality of image signals by the image processing device;
    providing a first selecting signal to the selecting module by the controller;
    converting the image signals into a plurality of converted image signals with a target image interface by the interface conversion module;
    generating at least two selected image signals from the converted image signals according to the first selecting signal by the selecting module;
    generating the composite image by overlaying the at least two selected image signals; and
    providing a loop-out selecting signal by the controller, wherein the loop-out selecting signal indicates one of the image signals as a loop-out selected image signal; and outputting the loop-out selected image signal with a first image interface according to the loop-out selecting signal by the receiving module.

13. The image processing method as claimed in claim 12, wherein the step of converting the image signals into the converted image signals comprises:
   providing a plurality of individual transmission paths; and
   transmitting the converted image signals respectively via the individual transmission paths.

14. The image processing method as claimed in claim 12, wherein:
   converting the one of the converted image signals with the target image interface into the loop-out selected image signal with the first image interface by the interface conversion module;
   transmitting the loop-out selected image signal to the receiving module by the interface conversion module.

15. The image processing method as claimed in claim 12, wherein the step of converting the image signals into the converted image signals comprises:
   converting one of the image signals carrying analog signal into the converted image signal carrying digital signal.

16. The image processing method as claimed in claim 15, wherein the one of the image signals is with a VGA interface.

17. The image processing method as claimed in claim 12, wherein the step of converting the image signals into the converted image signals comprises:
   converting one of the image signals into the converted the image signal with a YCbCr image interface.

18. The image processing method as claimed in claim 17, wherein the step of converting one of the image signals to the converted the image signal with a YCbCr image interface comprises:
   converting the converted image signal with a YCbCr image interface into the selected image signal with target image interface.

19. The image processing method as claimed in claim 12, further comprising:
   extending or shortening one of the selected image signals.

20. The image processing method as claimed in claim 12, further comprising:
   performing a warping operation to the selected image signals.

* * * * *